United States Patent [19]

Stephenson

[11] Patent Number: 5,230,962

[45] Date of Patent: Jul. 27, 1993

[54] ETCH-RESISTANT FINISHES WITH SILOXANE CROSS-LINKING

[75] Inventor: Maurice A. S. Stephenson, Philadelphia, Pa.

[73] Assignee: E. I. Du Pont de Nemours and Company, Wilmington, Del.

[21] Appl. No.: 989,049

[22] Filed: Dec. 11, 1992

[51] Int. Cl.$^5$ ............................................. B32B 27/00
[52] U.S. Cl. .................................. 428/423.1; 525/437; 525/438; 525/440; 525/441; 525/443; 525/445; 525/446; 525/452; 525/472; 524/81; 524/157; 524/284; 524/267; 106/287.1; 106/287.11; 106/287.12; 428/482; 428/524
[58] Field of Search ............... 525/437, 438, 440, 441, 525/443, 445, 446, 452, 472; 524/81, 157, 284, 267; 106/287.1, 287.11, 287.12; 428/423.1, 482, 524

[56] References Cited

U.S. PATENT DOCUMENTS

| | | | |
|---|---|---|---|
| 3,841,895 | 10/1974 | Hick | 428/422.8 |
| 4,617,057 | 10/1986 | Plueddemann | 106/2 |
| 4,632,964 | 12/1986 | Altschuler et al. | 525/456 |

Primary Examiner—Samuel A. Acquah
Attorney, Agent, or Firm—Chris P. Konkol

[57] ABSTRACT

A coating composition is disclosed comprising an acrylosilane polymer, an acrylic polyol, a polyester urethane or a copolymer thereof, an amino resin cross-linking agent, and a silsesquioxane compound. Such a composition is especially useful for providing a finish on metallic and/or non-metallic parts of automobiles and trucks. This finish has the advantage of superior etch resistance and outstanding weatherability and durability characteristics.

3 Claims, No Drawings

# ETCH-RESISTANT FINISHES WITH SILOXANE CROSS-LINKING

BACKGROUND OF THE INVENTION

This invention is related to a siloxane-containing etch-resistant coating composition useful for finishing both rigid and flexible substrates.

Finishes or coatings are required for a variety of substrates used in automobiles or trucks. A typical substrate is galvanized steel. However, other substrates include filler panels located between the bumper and the chassis of an automobile, fender extensions around headlights or tail lights, and other exterior trim parts. The use of plastic parts in the design of automobiles has been growing rapidly due to their adaptibility and lighter weight compared to steel parts. The increased use of plastics may help to meet fuel efficiency standards.

Finishes applied to metal parts of an automobile or truck are relatively rigid, and finishes applied to plastic parts are generally more flexible. Finishes that can potentially be applied to both metal and plastic parts may be termed universal finishes. U.S. Pat. No. 3,841,895 discloses a coating composition that provides a flexible finish for automobiles and trucks. U.S. Pat. No. 4,632,964 discloses a flexible clearcoat polyester urethane composition.

There is a need coating compositions that provide a finish having improved chemical etch resistance and durability or weatherability, for both plastics and steel substrates, a universal coating.

SUMMARY OF THE INVENTION

The composition of this invention is useful for providing a finish on substrates used in automotive production. Both plastic and metal applications are feasible. This composition is capable of forming a high quality clear finish when applied over a colored basecoat. The resulting finish has the advantage of superior etch resistance and outstanding weatherability and durabiilty characteristics. The coating composition comprising:

(a) from about 15 to 30% by weight of binder of an acrylic polyol;

(b) about 10 to 40% by weight, based on the weight of the binder, of an acrylosilane polymer having a weight average molecular weight of about 500-30,000;

(c) from about 10 to 25% by weight, based on the weight of the binder solids, of a polyesterurethane having a hydroxyl number of about 10-200 and a weight average molecular weight of about 6,000-30,000;

(d) from about 20 to 40%, based on the weight of the binder, of an amino resin crosslinking agent;

(e) from about 1 to 10%, based on the weight of the binder, of one or more silsesquioxane compounds;

(f) an effective amount of a curing catalyst; and (g) from about 20 to 80% by weight, based on the weight of the composition, of a liquid organic carrier.

The invention also includes a process for coating a substrate with the above coating composition. Finally, the invention includes a substrate having adhered thereto a coating according to the above composition.

The composition of the present invention is especially useful for forming a clear topcoat (clearcoat) over a pigmented basecoat (colorcoat). Such a clear topcoat can be applied over a variety of basecoats, such as powder basecoats or basecoats containing water or organic solvents.

DETAILED DESCRIPTION OF THE INVENTION

This invention provides a composition useful for providing clearcoat/colorcoat finishes that are used over substrates in automobiles and trucks.

The coating composition of the present invention suitably has a film-forming binder content of about 20-80% by weight and liquid carrier content of about 20-80% by weight. Preferably, the coating composition is a high solids coating that contains about 50-80% by weight of binder and 20-50% by weight of organic solvent for the binder.

The film-forming portion of the present coating composition, comprising polymeric components, is referred to as the "binder" or "binder solids" and is dissolved, emulsified or otherwise dispersed in an organic solvent or liquid carrier. The binder solids generally include all the normally solid polymeric non-liquid components of the total composition. Generally, catalysts, pigments, and non-polymeric chemical additives such as ultraviolet light stabilizers are not considered part of the binder solids. Non-binder solids other than pigments usually do not amount to more than about 10% by weight of the composition. In this disclosure, the term "binder" includes the polyesterurethane polymers, acrylic polymers, the acrylosilane polymer, the siloxane resins, the amino resin cross-linking agents, and any other optional film-forming polymers.

The percentage of the various components of the present composition will depend upon whether it is to be used as a universal coating or as a rigid coating. For a rigid coating, the binder of the present composition comprises from about 10 to 20%, preferably about 15%, based on the weight of the binder, of a polyesterurethane or copolymer thereof having a hydroxy number of about 10 to 200 and a weight average molecular weight of about 6,000-30,000. For a universal coating, the binder of the present composition comprises from about 15 to 30%, preferably about 25% (by weight of binder) of a polyesterurethane or copolymer thereof. In one embodiment, a preferred copolymer of a polyester urethanes is a polyester urethane silanes.

Polyesters which may be employed in this invention, in preparing the polyesterurethane or as an optional additional component, are suitably prepared from linear or branched chain diols, including ether glycols, or mixtures thereof or mixtures of diols and triols, containing up to and including 8 carbon atoms, in combination with a dicarboxylic acid, or anhydride thereof, or a mixture of dicarboxylic acids or anhydrides, which acids or anhydrides contain up to and including 12 carbon atoms, wherein at least 75% by weight, based on the weight of dicarboxylic acid, is an aliphatic dicarboxylic acid. A commericially available conventional polyester, which may be employed in the present composition, is Rucoflex 1015S-120 polyester, having a hydroxy number of 125 and composed of one mole of a glycol, 2 moles of adipic acid, and 2 moles of neopentyl glycol.

Polyester urethanes are suitably the reaction product of a hydroxyl terminated polyester and a polyisocyanate, preferably, an aliphatic or cycloaliphatic diisocyanate.

The polyester urethanes have a hydroxyl number of about 10-200 and preferably 40-160 and have a weight average molecular weight of about 6,000-30,000, preferably 9,000-17,000, and a number average molecular weight of about 2,000-5,000, preferably 3,000-4,000.

All molecular weights mentioned herein are measured using gel permeation chromatography using polyethyl methacrylate as a standard.

Representative saturated and unsaturated polyols that can be reacted to form a polyester for use in preparing a polyesterurethane include alkylene glycols such as neopentyl glycol, ethylene glycol, propylene glycol, butane diol, pentane diol, 1,6-hexane diol, 2,2-dimethyl-1,3-dioxolane-4-methanol, 4-cyclohexane dimethanol, 2,2-dimethyl 1,3-propanediol, 2,2-bis(hydroxymethyl)-propionic acid, and 3-mercapto-1,2-propane diol. Neopentyl glycol is preferred to form a flexible polyurethane that is soluble in conventional solvents.

Polyhydric alcohols, having at least three hydroxyl groups, may also be included to introduce branching in the polyester. Typical polyhydric alcohols are trimethylol propane, trimethylol ethane, pentaerythritol, glycerin and the like. Trimethylol propane is preferred, in forming a branched polyester.

The carboxylic acids include the saturated and unsaturated polycarboxylic acids and the derivatives thereof. Aliphatic dicarboxylic acids that can be used to form the polyester are as follows: adipic acid, sebacic acid, succinic acid, azelaic acid, dodecanedioic acid and the like. Prefered dicarboxylic acids are a combination of dodecandioic acid and azelaic acid. Aromatic polycarboxylic acids include phthalic acid, isophthalic acid, terephthalic acid, and the like. Anhydrides may also be used, for example, maleic anhydride, phthalic anhydride, trimellitic anhydride, and the like.

Typical polyisocyanates that may be used to form the polyester urethane are as follows: isophorone diisocyanate which is 3-isocyanatemethyl-3,5,5-trimethylcyclohexyl-isocyanate, propylene-1,2-diisocyanate, butylene-1,2-diisocyanate, butylene-1,3-diisocyanate, hexamethylene diisocyanate, methyl-2,6-diisocyanate, methyl-2,6-diisocyanate caproate, octamethlyene diisocyanate, 2,4,4-trimethylhexamethylene diisocyanate, nonamethylene diisocyante, 2,2,4-trimethylhexamethylene diisocyanate, decamethylene diisocyanate, 2,11-diisocyano-dodecane and the like, meta-phenylene diisocyanate, para-phenylene diisoxyanate, toluene-2, 4-diisocyanate, toluene-2,6-diisocyanate, xylene-2, 4-diisocyanate, xylene-2,6-diisocyanate, dialkyl benzene diisocyanates, such as methylpropylbenzene diisocyanate, methylethylbenzene diisocyanate, and the like: 2,2'-biphenylene diisocyanate, 3,3'-biphenylene diisocyanate, 4,4'-biphenylene diisocyanate, 3,3'-dimethyl-4,4'-biphenylene diisocyanate, and the like; methylene-bis(4-phenyl isocyanate), ethylene-bis(4-phenyl isocyanate), isopropylidene-bis(4-phenyl isocyanate), butylene-bis(4-phenylisocyanate), and the like; 2,2'-oxydiphenyl diisocyanate, 3,3'-oxydiphenyl diisocyanate, 4,4'-oxydiphenyl diisocyanate, 2,2'-ketodiphenyl diisocyanate, 3,3'-ketodiphenyl diisocyanate, 4,4'-ketodiphenyl diisocyanate, 2,2'-thiodiphenyl diisocyanate, 3,3'-thiodiphenyl diisocyanate, 4,4'-thiodiphenyl diisocyanate, and the like.

Aliphatic diisocyanates are preferred, forming urethanes that have excellent weatherability. One aliphatic diisocyanate that is particularly preferred is a mixture of 2,2,4-trimethyl hexamethylene diisocyanate and 2,4,4-trimethyl hexamethylene diisocyanate. One cycloaliphatic diisocyanate that is particularly preferred is 4,4-methylene-bis(cyclohexylisocyanate).

A preferred polyester urethane is the reaction product of trimethylhexamethylene diisocyanate and a hydroxy terminated polyester of neopentyl glycol, trimethylol propane, azelaic acid and dodecanedioic acid.

Another polyester urethane is the reaction product of 4,4-methylene-bis(cyclohexyl isocyanate) and a hydroxy terminated polyester of 1,6 hexane diol, cyclohexane diethanol, trimethylol propane and azelaic acid.

A polyester component of a polyesterurethane may be prepared by conventional techniques in which the component polyols and carboxylic acids and solvent are esterified at about 110°-250° C. for about 1-10 hours to form a polyester. To form a polyester urethane, a polyisocyanate may then be added and reacted at about 100°-200° C. for about 15 minutes to 2 hours.

In preparing the polyester, an esterification catalyst is typically used. Conventional catalysts include benzyl trimethyl ammonium hydroxide, tetramethyl ammonium chloride, organic tin compounds, such as dibutyl tin diaurate, dibutyl tin oxide stannous octoate and the like, titanium complexes and litharge. About 0.1-4% by weight, based on the total weight of the polyester, of the catalyst is typically used. The aforementioned catalysts may also be used to form the polyester urethane.

The stoichiometry of the polyester preparation is controlled by the final hydroxyl number and by the need to obtain a product of low acid number; an acid number below 10 is preferable. The acid number is defined as the number of milligrams of potassium hydroxide needed to neutralize a 1 gram sample of the polyester. Additional information on the preparation of polyester urethanes is disclosed in commonly assigned U.S. Pat. No. 4,810,759, hereby incorporated by reference.

The acrylosilane polymer component of the present invention is, by itself, generally known. The acrylosilane polymer of the present composition has a weight average molecular weight of about 500-30,000 and a number average molecular weight of about 500-10,000. For either a universal or a rigid coating, the acrylosilane polymer is suitably present in an amount ranging from 10 to 20% (by weight of binder), preferably about 13.5%. Too much acrylosilane may result in insufficient flexibility, whereas an insufficient amount may result in insufficient etch resistance.

The silane polymer is the polymerization product of about 30-95%, preferably 40-60%, by weight ethylenically unsaturated non-silane containing monomers and about 5-70%, preferably 30-60% by weight ethylenically unsaturated silane containing monomers, based on the weight of the acrylosilane polymer. Suitable ethylenically unsaturated non-silane containing monomers are alkyl acrylates, alkyl methacrylates and any mixtures thereof, where the alkyl groups have 1-12 carbon atoms, preferably 3-8 carbon atoms.

Suitable alkyl methacrylate monomers used to form the organosilane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate momomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohexyl methacrylate, trimethylcyclohexl acrylate, iso-butyl methacrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

In addition to alkyl acrylates or methacrylates, other non-silane containing polymerizable monomers, up to about 50% by weight of the polymer, can be used in the acrylosilane polymer for the purpose of achieving the desired properties such as hardness, appearance, mar resistance, and the like. Exemplary of such other monomers are styrene, methyl styrene, acrylamide, acrylonitrile, methacrylonitrile, and the like. Styrene is preferably used in the range of about 0–50% by weight.

A suitable silane containing monomer useful in forming the acrylosilane polymer is an alkoxysilane having the following structural formula:

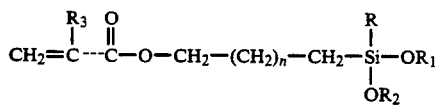

wherein R is either $CH_3$, $CH_3CH_2$, $CH_3O$, or $CH_3CH_2O$; $R_1$ and $R_2$ are $CH_3$ or $CH_3CH_2$; and $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acrylatoalkoxy silanes, such as gamma-acryloxypropyltrimethoxy silane and the methacrylatoalkoxy silanes, such as gamma-methacryloxypropyltrimethoxy silane, and gamma-methacryloxypropyltris(2-methoxyethoxy) silane.

Other suitable alkoxy silane monomers have the following structural formula:

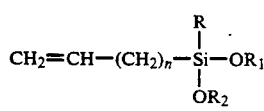

wherein R, $R_1$ and $R_2$ are as described above and n is a positive integer from 1 to 10.

Examples of such alkoxysilanes are the vinylalkoxy silanes, such as vinyl trimethoxy silane, vinyl triethoxy silane and vinyl tris(2-methoxyethoxy)silane.

Other suitable silane containing monomers are ethylenically unsaturated acyloxysilanes, including acrylatoxy silane, methacrylatoxy silane and vinylacetoxy silanes, such as vinylmethyldiacetoxy silane, acrylatopropyl triacetoxy silane, and methacrylatopropyltriacetoxy silane. Of course, mixtures of the above-mentioned silane containing monomers are also suitable.

Consistent with the above mentioned components of the silane polymer, an example of an organosilane polymer useful in the coating composition of this invention may contain the following constituents: 0 to 50% by weight styrene, 30–60% by weight methacryloxypropyl trimethoxy silane, 0 to 20% butylmethacrylate, and about 0–15% by weight ethylcyclohexyl acrylate or trimethylcyclohexyl methacrylate.

A preferred acrylosilane comprises 50% styrene, 5% methyl methacrylate, 5% butyl methacrylate, 5% 2-ethylhexyl methacrylate, and 35% gamma-methacryloxypropyltrimethoxysilane (A-174 commercially available from Union Carbide) This polymer has a number average molecular weight of 1500, a weight average molecular weight of 3700 and a glass transition temperature of 6° C. Of course, the monomers used and the ratios thereof may vary within wide ranges, depending on the particular application. The acrylosilane resins may be prepared by a free radical process or by cobalt special chain transfer or by what is known as GTP (group transfer procedure).

Silane functional macromonomers also may be used in forming the silane polymer. These macromonomers are the reaction product of a silane containg compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1–4 carbon atoms in the alkyl group and an isocyanatoalkyl alkoxysilane such as isocyanatopropyl triethoxysilane.

Typical of such above mentioned silane functional macromonomers are those having the following structural formula:

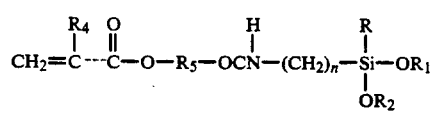

wherein R, $R_1$, and $R_2$ are as described above; $R_4$ is H or $CH_3$, $R_5$ is an alkylene group having 1–8 carbon atoms and n is a positive integer from 1–8.

Dual functional silane polymers which contain both polymerized units of hydroxy-functional monomers in addition to silane functional monomers may also be used in the present compostion.

Another component of the present invention is an acrylic polyol which can comprise polymeric units of alkyl acrylate, alkyl methacrylate, and the like as mentioned with respect to the acrylosilane polymer. The hydroxy-functional units may be introduced by such monomers as 2-hydroxy acrylate, 2-hydroxyethyl methacrylate, hydroxypropyl methacrylate, and so on. For a rigid composition, the amount of polyol, based on the weight of the binder, is suitably 15 to 30%, preferably 20% For the universal coating, a suitable range is 1–20%, preferably about 20% by weight of binder. The polyol suitably has a hydroxy number of 10–200, preferalby 100–200 and a molecular weight of 500–30,000, preferably 3000 to 5000.

An example of a preferred polyol comprises 15% styrene, 30% butyl methacrylate, 17% butyl acrylate, and 38% hydroxypropyl acrylate. This acrylic copolymer has a hydroxy number of 155–169.

A critical component of the present composition is one or more silsesquioxanes. For both universal and rigid compositions, such silsesquioxanes may suitably be present in the amount of 1 to 10% by weight, based on the weight of the binder, preferably about 5.4%, to improve the etch resistance when used to provide a coating. Silsesquioxane compounds are oligomers that may be visualized as composed of tetracylosiloxane rings, for example as follows:

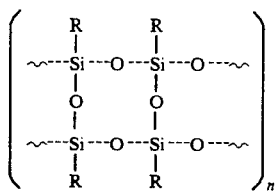

The number of repeating units is suitably 2 or more, preferably 2 to 12. Exemplary compounds, commercially available from Petrarch Systems, Inc. (Bristol, Pa.) include polymethylsilsesquioxane, polyphenylmethyl silsesquioxane, polyphenylpropylsilsesquioxane, polyphenylsilsesquioxane, polyphenyldimethylsilsesquioxane, and polyphenylvinylsilsesquioxane.

Such silsesquioxanes have a plurality of consecutive SiO$_3$R— groups, forming SiO cages or "T" structures or ladders. The various rough geometries depend on the n in the above formula, which may vary from 2 to 12 or greater. These silsesquioxane compounds should have at least 1 hydroxy group, preferably at least 4. However, the greater the number of hydroxy groups, the greater the amount of crosslinking. A preferred polysilsesquioxane may be depicted as having the following structural formula:

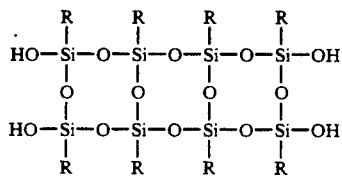

In the above formula, R is a substituted or unsubstituted alkyl, alkoxy or pheny or combination thereof. Substituents include hydroxy, halo groups such as fluoro, and haloalky groups such as trifluoromethyl. As one example, in the above formula, R may consist of about 70 mole percent of phenyl and 30 mole percent propyl. Such a compound is commercially available as Z-6018 from Dow Corning. This compound has a Mw of 1600, 4 SiOH groups, and an OH equivalent weight of 330–360.

The presence of one or more silsesquioxane compounds in the present composition provides outstanding etch performance in a coating. This may be due to the disproportionate amount of silicon found nearer the top surface of the coating on account of the presence of these compounds.

Another necessary component of the present invention is an amino resin crosslinking agent. Such resins are well known in the art and are generally discussed in Swaraj, P., SURFACE COATINGS, John Wiley & Sons (1986) at pages 167–194. In the present composition, for a rigid coating, this amino crosslinking agent suitably comprises about 25 to 35% by weight of the binder, preferably about 30%. For a universal coating, the composition suitably comprises 20 to 30% by weight of binder, preferably about 25% of an amino crosslinking agent. These amino resins are the alkylated products of amino resins prepared by the condensations of at least one aldehyde with at least one of urea, N,N'-ethylene urea, dicyandiamide, and amino triazines such as melamines and guanamines. Among the aldehydes that are suitable are formaldehyde, revertible polymers thereof such as paraformaldehyde, acetaldehyde, crotonaldehyde, and acrolein. Preferred are formaldehyde and revertible polymers thereof. The amino resins are alkylated with 1–6 alkanol molecules containing 1–6 carbon atoms. Preferably the amino resins are alkylated with 3–6 alkanol molecules, wherein the preferred alkanols are methanol or n-butanol. Preferred nitrogen resins include melamine resins such as partially butylated melamine-formaldehyde resins or partially butylated melamine-formaldehyde resins.

Preferably, the crosslinking agent used in the composition is a methylated and butylated melamine formaldehyde that has a degree of polymerization of about 1–3 or higher. One such melamine formaldehyde contains about 50% butylated groups and 50% methylated groups. Typically these crosslinking agents have a number average molecular weight of about 300–600 and a weight average molecular weight of about 500–1500. Examples of commercially available resins are "Cymel" 1168, "Cymel" 1161, "Cymel" 1158, "Resimine" 4514, and "Resimine" 354.

The amino resin crosslinking agents can be utilized neat or dissolved in organic solvents. Acceptable solvents include methanol, isopropanol, n-butanol, toluene, xylene, hydrocarbon solvents, 2-butoxy-1-ethanol, and mixtures thereof.

During the crosslinking reaction to be described below, the amino resins crosslink with themselves and/or the polyester urethane and/or the acrylosilane polymers and/or the acrylic polyol.

The composition of the present invention provides a coating with excellent durability, flexibility, and etch resistance, which attributes are required for many end uses such as coatings or finishes and the like.

The composition of the present invention may be used to coat flexible, rubbery, plastic, foamed or unfoamed, semi-rigid, and metallic substrates. Examples of suitable substrates are flexible hydrocarbon rubbers such as EPDM (terpolymers of ethlene, propylene, , and diene), butyl rubber, styrene-butadiene rubber, polybutadiene rubber or polyisoprene rubber; urethane and Hytrel ® (registered trademark of E.I. du Pont de Nemours & Company) polyester rubber; injection molded polyester urethane; elastoplastic microcellular urethane foam; ABS (terpolymers of acrylonitrile; butadiene, and styrene); steel; aluminum.

Typical solvents and diluents which may be employed as a carrier for the composition include, for example, toluene, xylene, butyl acetate, acetone, methylisobutyl ketone, methylethyl ketone, methanol, isopropanol, butanol, hexane, acetone, ethylene glycol monoethyl ether, VM and P naphtha, mineral spirits and other aliphatic, cycloaliphatic, aromatic hydrocarbons, esters, ethers and ketones and the like.

An acid catalyst solution may be added to composition to increase the rate of crosslinking of the composition on curing. Generally, about 0.1–2% by weight, based on the weight of the composition, of acid catalyst is used. Sulfonic acid or a substituted sulfonic acid can be used such as para-toluene sulfonic acid, dodecylbenzene sulfonic acid or dinonyl naphthalene disulfonic acid and mixtures thereof.

Adducts of the aforementioned acids also may be used as catalysts. For example, epoxy resins or amines reacted with a substituted sulfonic acid may be used. Typical epoxy resins that may be used to form these adducts are "Epon" 828, 1001, 1002, 1003, 1004 which are the condensation products of epichlorohydrin and bisphenol A. Amines that are useful for forming adducts of these acids include primary, secondary and tertiary amines such as n-propyl amine, diisopropanol amine, dimethyl oxazolidine, dimethyl ethanol amine and others. Selection of the amines to be used is dependent upon baking conditions and package stability requirements.

Other catalysts that may be used include phosphoric acid, alkyl acid phosphate and organic acid sulfate esters.

To improve weatherability of the clear finish of the coating composition, about 0.1-5%, by weight, based on the weight of the binder, of an ultraviolet light stabilizer or a combination of ultraviolet light stabilzers may be added. These stabilizers include ultraviolet light absorbers, screeners, quenchers and specific hindered amine light stabilizers. Also, about 0.1-5% by weight, based on the weight of the binder, of an antioxidant may be added.

Particularly useful ultraviolet light stabilizers that may be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate (5)]-Ni, bis[phenyldithiocarbamato]-Ni(II), and others listed in the latter patent, at column 8, line 44 through line 55.

The composition may also include other conventional formulation additives such as flow control agents, for example, such as Resiflow ® S (polybutylacrylate), BYK 320 and 325 (high molecular weight polyacrylates); rheology control agents, such as fumed silica; water scavengers such as tetrasilicate, trimethyl orthoformate, triethyl orthoformate and the like.

When the present composition is used as a clearcoat (topcoat) over a pigmented colorcoat (basecoat) to provide a colorcoat/clearcoat finish, small amounts of pigment can be added to the clear coat to eliminate undesirable color in the finish such as yellowing.

The present composition also can be pigmented and used as the colorcoat, or as a monocoat or even as a primer or primer surfacer. The composition has excellent adhesion to a variety of substrates, such as previously painted substrates, cold rolled steel, phosphatized steel, and steel coated with conventional primers by electrodeposition. The present composition exhibits excellent adhesion to primers, for example, those that comprise crosslinked epoxy polyester and various epoxy resins, as well as alkyd resin repair primers.

When the present coating composition is used as a basecoat, typical pigments that can be added to the composition inculde the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake and the like.

The pigments can be introduced into the coating composition by first forming a mill base or pigment dispersion with any of the aforementioned polymers used in the coating composition or with another compatable polymer or dispersant by conventional techniques, such as high speed mixing, sand grinding, ball milling, attritor grinding or two roll milling. The mill base is then blended with the other constituents used in the coating composition.

The coating composition can be applied by conventional techniques such as spraying, electrostatic spraying, dipping, brushing, flowcoating and the like. The preferred techniques are spraying and electrostatic spraying. After application, the composition is typically baked at 100°-150° C. for about 15-30 minutes to form a coating about 0.1-3.0 mils thick. When the composition is used as a clearcoat, it is applied over the colorcoat which may be dried to a tack-free state and cured or preferably flash dried for a short period before the clearcoat is applied. The colorcoat/clearcoat finish is then baked as mentioned above to provide a dried and cured finish.

It is customary to apply a clear topcoat over a basecoat (for solventborne basecoats) by means of a "wet on wet" application, i.e., the topcoat is applied to the basecoat without curing or completely drying the basecoat. The coated substrate is then heated for a predetermined time period to allow simultaneous curing of the base and clear coats.

The following examples illustrate the invention. All parts and percentages are on a weight basis unless otherwise indicated. The weight average molecular weight of polymers was determined by GPC (gel permeation chromatography) using polyethyl methacrylate as a standard.

EXAMPLE 1

A polyester urethane solution may be prepared by charging the following constituents into a reaction vessel equipped with a stirrer, a heating source and a reflux condenser:

|  | Parts by Weight |
| --- | --- |
| Portion 1 |  |
| Water | 212.30 |
| Neopentyl glycol | 1910.60 |
| Portion 2 |  |
| Trimethylol propane | 259.53 |
| Azelaic acid | 1454.24 |
| Dodecanedioic acid | 1779.12 |
| Portion 3 |  |
| Toluene | 113.60 |
| Portion 4 |  |
| Toluene | 190.55 |
| Aromatic hydrocarbon solvent | 886.00 |
| Portion 5 |  |
| Neopentyl glycol | 394.03 |
| Stannous octoate | 0.85 |
| Portion 6 |  |
| 2,3,5-trimethylhexamethylene diisocyanate | 1069.52 |
| Portion 7 |  |
| Aromatic hydrocarbon solvent | 945.70 |
| Total | 9216.04 |

Portion 1 was charged into the reation vessel, the reaction vessel was purged with nitrogen, and the constituents of Portion 1 were heated to about 65°-70° C. The constituents of Portion 2 were charged into the vessel in the order shown, while the constituents in the vessel were maintained at the above temperature. The constituents then were heated to 120° C., and the resulting composition was refluxed to remove water as a polyester was formed. The temperature was gradually increased as water was removed until it reached about 240° C. Heating was continued until an acid number of the polyester was about 0–1.5. Portion 3 then was added. Heating was stopped and Portion 4 was added to cool the resulting compostion to about 120° C. Portion 5 was then added and the moisture content of the composition was determined by a Fisher method. If the moisture content was over 0.1%, the composition would be dried azeotropically for 3 minutes and the moisture content determined again. Portion 6 was added to the composition at a uniform rate over a 30 minute period without external heating. The composition was held at about 120°–145° C. for 30 minutes and a sample removed and tested for unreacted isocyanate by infrared analysis. If there was unreacted isocyanate in the composition, the composition would be held for a additional 30 minutes at the above temperature.

Portion 7 then was added and the resulting composition was allowed to cool to ambient temperatures.

The resulting composition had a polymer weight solids content of about 76%. The polyester urethane contained about 32% neopentyl glycol, 4% trimethylol propane, 22% azelaic acid, 26% dodecanedioic acid and 16% trimethylhexamethylene diisocyanate and had a Mw (weight average molecular weight) of 15,000 determined by GPC and had a hydroxyl number of about 80.

For curing the composition, a catalyst comprising a blocked aromatic sulfonic acid solution was prepared as follows:

|  | Parts by Weight |
|---|---|
| Portion 1 | |
| Methanol | 267.26 |
| Aromatic sulfonic acid solution (70% solids of dodecyl benzene sulfonic acid in isopropanol) | 296.99 |
| Methanol | 36.35 |
| Portion 2 | |
| Oxazoline solution (76% 4,4-dimethyl-1-oxa-3-azacyclopentane, 2% 3,44-trimethyl-1-oxa-azocyclopentane in 22% water) | 91.05 |
| Portion 3 | |
| Metanol | 36.35 |
| Total | 728.00 |

Portion 1 was charged into a reaction vessel and then portion 2 was added and allowed to react and then portion 3 was added and the solution was cooled to an ambient temperature.

EXAMPLE 2

This example illustrates another polyester urethane, which was prepared by charging the following constituents into a reaction vessel equipped as in Example 1.

|  | Parts by Weight |
|---|---|
| Portion 1 | |
| Cyclohexane dimethanol | 1015.20 |
| Trimethylol propane | 311.85 |
| Azelaic acid | 1163.70 |
| Toluene | 45.60 |
| Portion 2 | |
| Xylene | 403.2 |

|  | Parts by Weight |
|---|---|
| Portion 3 | |
| 1,6-hexane diol | 172.3 |
| Portion 4 | |
| Stannous octoate | 0.3 |
| Portion 5 | |
| 4,4'-methylene-bis-(cyclohexylisocyanate) | 513.2 |
| Portion 6 | |
| Xylene | 503.2 |
| Total | 4128.55 |

The cyclohexane dimethanol was melted and charged with the other constituents of Portion 1 into the reaction vessel and heated to 120°–240° C. About 222.8 parts of water were removed and the acid no. of the resulting polyester was about 0–2. Portion 2 then was added to the polyester and held at 120° C. Portion 3 was melted and then added to the reaction mixture, and Portion 4 was added and the reaction mixture was held at 120° C. Portion 5 was added over a 30 minute period while maintaining the temperature of the reaction mixture at about 120°–140° C. The mixture was held at this temperature for an additional 30 minutes. A sample was tested by infrared analysis for isocyanate. In the event isocyanate was present, the reaction would be continued until all isocyante was reacted. Portion 6 then was added.

The resulting polyester urethane solution had a polymer solids content of 71% of a Gardner Holdt viscosity measured at 25° C. of Z5-¼. The polyester urethane had an acid no. of about 1.5, a hydroxyl no. of 143, Mn of 3920 and Mw of 11,800.

EXAMPLE 3

This example illustrates a further example of a polyester urethane, which was prepared by charging the following constituents into a reaction vessel equipped as in Example 1:

|  | Parts by Weight |
|---|---|
| Portion 1 | |
| 1,6 hexane diol | 831.90 |
| Trimethylol propane | 311.85 |
| Azelaic Acid | 1163.70 |
| Toluene | 46.00 |
| Portion 2 | |
| Xylene | 383.80 |
| Portion 3 | |
| Cyclohexane dimethanol | 210.00 |
| Stannous octoate | 0.30 |
| Portion 4 | |
| 4,4'-Methylene-bis-(cyclohexylisocyanate) | 512.90 |
| Portion 5 | |
| Xylene | 480.00 |
| Total | 3940.45 |

The 1,6 hexane diol was melted and charged with other constituents of Portion 1 into the reaction vessel and heated to 120°–240° C. About 222.8 parts of water were removed and the acid no. of the polyester was about 0–2. Portion 2 was added. The cyclohexane dimethanol of Portion 3 was melted and then added, and then the stannous octoate was added and the mixture heated to 120° C. Portion 4 was added over a 30 minute period and the reaction mixture was held at 120°-140° C., and then held at this temperature for an additional 30 minutes. A sample was tested by infrared analysis for isocyanate. If isocyanate was present, the reaction would be continued until all isocyanate was reacted Portion 5 then was added.

The resulting polyester urethane solution had a polymer solids content of about 72%, a Gardner Holdt viscosity measured at 25° C. of Z1.+1/3. The polyester urethane had an acid no. of 1.59, a hydroxyl no. of 155.5, Mn of 1,400 and Mw of 10,000.

EXAMPLE 4

This example illustrates an acylosilane polymer for use in the present composition, which acrylosilane polymer is prepared by charging the following constituents into a polymerization reactor equipped with a heat source and a reflux condensor:

|  | Parts by Weight |
|---|---|
| Portion I |  |
| "Solvesso" 100 | 75.00 |
| Portion II |  |
| Methacryloxypropyltrimethoxy silane | 300.00 |
| Styrene monomer | 173.00 |
| Isobutyl methacrylate monomer | 103.86 |
| "Solvesso" 100 | 45.02 |
| Portion III |  |
| 2,2-(2-methyl butane nitrile) | 57.32 |
| "Solvesso" 100 | 85.80 |
| Total | 840.00 |

The "Solvesso" 100 is a conventional aromatic hydrocarbon solvent. Portion I is charged into the reactor and heated to its reflux temperature. Portion II, containing the monomers for the organosilane polymer, and Portion III, containing the polymerization initiator, are each premixed and then added simultaneously to the reactor while the reaction mixture is held at its reflux temperature. Portion II is added at a uniform rate over a 6 hour period and Portion II is added at a uniform rate over a 7 hour period. After Portion II is added, the reaction mixture is held at its reflux temperature for an additional hour. The resulting acrylosilane polymer solution is cooled at room temperature and filtered.

The resulting acrylosilane polymer solution has a polymer solids content of about 70%, the polymer has a weight average molecular weight of about 3,000, and has the following constituents: 30% styrene, 18% isobutyl methacrylate, and 52% methacryloxypropyl trimethoxysilane. Another acrylosilane polymer was prepared which comprised 50% by weight styrene, 30% by weight methacryloxypropyl trimethoxysilane, 5% methyl methacrylate, 5% butyl methacrylate, and 5% ethylhexyl acrylate.

EXAMPLE 5

Various clear coating composition was prepared by blending together the following constituents:

| COMPONENT | COMPOSITION | | | | |
|---|---|---|---|---|---|
|  | A % Weight | B % Weight | C % Weight | D % Weight | E % Weight |
| Acrylic Polyol, | 18 | 19 | 19 | 19 | 19 |
| Polyester Urethane (prepared in Example 1) | 19.40 | 19.40 | 19.40 | 22.10 | 23.65 |
| Melamine, "Cymel" 1168 | 30.0 | 30.0 | 30.0 | 30.0 | 30.0 |
| Acrylosilane Resin | 13.5 | 13.5 | 13.5 | 13.5 | 13.5 |
| Siloxane Polymer (Z-6018) | 5.4 | — | — | — | — |
| Siloxane Polymer (6-2230) | — | 5.4 | — | — | — |
| Siloxane Polymer (Polymethylsilsesquioxane) | — | — | 5.4 | 2.7 | 1.25 |
| Catalyst: (1) Dibutyl Tin Dilaurate | 0.3 | 0.3 | 0.3 | 0.3 | 0.3 |
| Catalyst: (2) Strong Sulfonic Acid | 0.45 | 0.45 | 0.45 | 0.45 | 0.45 |
| Stabilizer: Tetramethyl Ortho Formate | 5.0 | 5.0 | 5.0 | 5.0 | 5.0 |
| Additive: (1) Resnflow S ® | 0.3 | 0.3 | 0.3 | 0.3 | 0.3 |
| Additive: (2) Tinuvin ® 123 | 1.6 | 1.6 | 1.6 | 1.6 | 1.6 |
| Additive: (3) Tinuvin ® 1130 | 3.2 | 3.2 | 3.2 | 3.2 | 3.2 |

All of the above provided etch-resistant clearcoat systems, even at a the level of 1.25% polymethylsilsesquioxane. Formula C, however, showed poor direct recoat adhesion.

As a liquid carrier, a combination of two solvents in the amount of 60% and 40%, respectively, of the above components, the first solvent being a paraffinic naphtha having a boiling point of 100°-150° C. and the second solvent being an aromatic hydrocarbon having a boiling point of 150° to 190° C. The constituents were added to a mixing vessel and blended to form a clearcoat composition.

The resulting clearcoat composition, having a solids content of 54% at 35 secs viscosity, was sprayed onto primed flexible panels of reaction injection molded urethane that were coated with a pigmented flexible acrylic basecoat. The composition was sprayed onto the panels before the basecoat was baked. The panels were baked at 250° F. for 30 minutes. The clear coating on each of the panels was about 2 mils thick. The clear coating had a hardness of 5.0 knoop out of the oven and passed room temperature flexibility. The gloss and distinctness of image was good. The etch performance was tested by application of a 10% by weight $H_2SO_4$ solution. the solution was spotted on the coating and heated at various temperatures for 30 minutes at temperatures of 160° F. (71° C.), 140° F. (60° C.), and 120° F. (49° C.). Spots were then rated on a scale of zero to ten, with zero being considered the best. The samples tested was spot free and no etching was observed.

Various modifications, alterations, additions, or substitutions of the components of the composition of this invention will be apparent to those skilled in the art without departing from the scope and spirit of this invention. This invention is not limited to the illustrative embodiments set forth herein, but rather the invention is defined by the following claims.

What is claimed is:

1. A coating composition useful for coating a substrate, which composition comprises:
   (a) from about 15 to 30% by weight of binder of an acrylic polyol having a weight average molecular weigh of 500-30,000;
   (b) from about 10 to 40% by weight, based on the weight of the binder, of an acrylosilane polymer having a weight average molecular weight of about 500-30,000;
   (c) from about 10 to 25% by weight, based on the weight of the binder solids, of a polyester urethane having a hydroxyl number of about 10-200 and a weight average molecular weight of about 6,000-30,000;
   (d) from about 20 to 40%, based on the weight of the binder, of an amino resin crosslinking agent;
   (e) from about 1 to 10%, based on the weight of the binder, of one or more silsesquioxane compounds;
   (f) an effective amount of a curing catalyst; and
   (g) from about 20 to 80% by weight, based on the weight of the composition, of a liquid organic carrier.

2. The coating composition of claim 1, wherein the silsesquioxane is represented by the following structural formula:

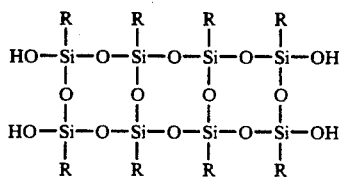

wherein R is a substituted or unsubstituted alkyl, alkoxy or pheny and combinations thereof and wherein said alkyl or alkoxy has 1-6 carbon atoms.

3. A substrate coated with a cured layer of the composition of claim 1.

* * * * *